United States Patent [19]

Shimada et al.

[11] Patent Number: 4,794,471
[45] Date of Patent: Dec. 27, 1988

[54] MODE PROCESSING CIRCUIT

[75] Inventors: Keiichiro Shimada, Kanagawa; Yuriko Kishitaka, Chiba; Toru Miura, Kanagawa; Koji Iwamoto, Tokyo; Kenichi Ito, Kanagawa; Ryo Ito; Katsumi Matsuno, both of Tokyo, all of Japan

[73] Assignee: Sony Corporation, Japan

[21] Appl. No.: 60,049

[22] Filed: Jun. 9, 1987

[30] Foreign Application Priority Data

Jun. 11, 1986 [JP] Japan .............................. 61-135349
Jun. 13, 1986 [JP] Japan .............................. 61-137996

[51] Int. Cl.⁴ .............................................. G11B 5/02
[52] U.S. Cl. ....................................... 360/69; 360/137
[58] Field of Search .................................. 360/69, 137

[56] References Cited

U.S. PATENT DOCUMENTS

4,272,792 6/1981 Nakamichi et al. ................. 360/69
4,503,471 3/1985 Hanajima et al. .................... 360/69
4,758,910 7/1988 Kaneko et al. ..................... 360/137

Primary Examiner—Robert S. Tupper
Attorney, Agent, or Firm—Limbach, Limbach & Sutton

[57] ABSTRACT

A mode processing circuit for a multi-operation mode electronic apparatus including a mode stack having a plurality of stages in which an input command signal is stored as an operation mode of the multi-operation mode electronic apparatus, wherein the operation mode inputted to the mode stack is sequentially stored and optimized and the optimized operation mode is read out from the mode stack in the sequential order and then executed after the transition of the operation mode is ended.

8 Claims, 11 Drawing Sheets

| TIME POINT | KEY INPUT | PRESENT MODE | MODE STACK | | | | FINAL MODE & INDICATION |
|---|---|---|---|---|---|---|---|
| | | | 1ST STAGE | 2ND STAGE | 3RD STAGE | 4TH STAGE | |
| | | STOP | VACANT | VACANT | VACANT | VACANT | STOP |
| $t_1$ | REC | | | | | | REC |
| | | STOP | REC | | | | |
| | | REC | | | | | REC |
| $t_2$ | STOP | | | | | | |
| | | | REC | STOP | | | STOP |
| $t_3$ | PAUSE | | | | | | |
| | | | REC | STOP | | | STOP |
| $t_4$ | REW | | | | | | |
| | | | REC | STOP | REW | | REW |
| $t_5$ | STOP | | | | | | |
| | | | REC | STOP | REW | STOP | STOP |
| | | | REC | STOP | | | STOP |
| $t_6$ | PB | | | | | | |
| | | | REC | STOP | PB | | PB |
| $t_7$ | FF | | | | | | |
| | | | REC | STOP | PB | CUE | CUE |
| $t_8$ | | | | | | | |
| $t_9$ | | | STOP | PB | CUE | | CUE |
| $t_{10}$ | | | | | | | |
| $t_{11}$ | | | | PB | CUE | | CUE |
| $t_{12}$ | | | | | | | |
| $t_{13}$ | FF | | CUE | | | | CUE |

TIME →

| KEY INPUT / FINAL MODE | STOP | PB | REC | PAUSE |
|---|---|---|---|---|
| STOP | (INVALID) | PB | REC | (INVALID) |
| PB | STOP | (INVALID) | (INVALID) | PB PAUSE |
| PB PAUSE | STOP | PB | (INVALID) | PB |
| REC | STOP | (INVALID) | (INVALID) | REC PAUSE |
| REC PAUSE | STOP | (INVALID) | (INVALID) | REC |

| FINAL MODE \ KEY INPUT | STOP | FF | REW | PB | PAUSE | REC |
|---|---|---|---|---|---|---|
| STOP | (INVALID) | FF | REW | PB | (INVALID) | REC |
| FF | STOP | (INVALID) | REW | PB | (INVALID) | (INVALID) |
| REW | STOP | FF | (INVALID) | PB | (INVALID) | (INVALID) |
| PB | STOP | (INVALID) | (INVALID) | (INVALID) | PB PAUSE | (INVALID) |
| PB PAUSE | STOP | (INVALID) | (INVALID) | PB | PB | (INVALID) |
| REC | STOP | (INVALID) | (INVALID) | (INVALID) | REC PAUSE | (INVALID) |
| REC PAUSE | STOP | (INVALID) | (INVALID) | (INVALID) | REC | (INVALID) |

FIG. 13

| PRESENT MODE \ FINAL MODE | STOP | FF | REW | PB | PB PAUSE | REC | REC PAUSE |
|---|---|---|---|---|---|---|---|
| STOP | — | STOP→FF | STOP→REW | STOP→PB | STOP→PB PAUSE | STOP→REC | STOP→REC PAUSE |
| FF | FF→STOP | — | FF→REW | FF→PB | FF→STOP→PB | FF→STOP→REC | FF→STOP→REC |
| REW | REW→STOP | REW→FF | — | REW→PB | REW→PB | REW→STOP→REC | REW→STOP |
| PB | PB→STOP | PB→FF | PB→STOP→REW | — | PB→PB PAUSE | PB→REC | PB→PB PAUSE→REC PAUSE |
| PB PAUSE | PB PAUSE→STOP | PB PAUSE→STOP→FF | PB PAUSE→STOP→REW | PB PAUSE→PB | — | PB PAUSE→REC PAUSE | PB PAUSE→REC PAUSE |
| REC | REC→STOP | REC→STOP→FF | REC→STOP→REW | REC→STOP | REC→STOP | — | REC→REC PAUSE |
| REC PAUSE | REC PAUSE→STOP | REC PAUSE→STOP→FF | REC PAUSE→STOP→REW | REC PAUSE→STOP | REC PAUSE→STOP | REC PAUSE→REC | — |

FIG. 14

| TIME POINT | KEY INPUT | MODE TRANSITION | PRESENT MODE | FINAL MODE & INDICATION |
|---|---|---|---|---|
| | | | STOP | STOP |
| $t_1$ | PB | STOP ⟶ PB | PB | PB |
| $t_2$ | STOP | STOP ⟶ PB | PB | STOP |
| $t_3$ | REC | STOP ⟶ PB | PB | REC |
| $t_4$ | | (TRANSITION ENDED) PB ⟶ PB PAUSE | PB PAUSE | REC |
| $t_5$ | | (TRANSITION ENDED) PB PAUSE ⟶ REC PAUSE | REC PAUSE | REC |
| $t_6$ | | (TRANSITION ENDED) REC PAUSE ⟶ REC | REC | REC |
| $t_7$ | | (TRANSITION ENDED) | REC | REC |

FIG. 15

MODE PROCESSING CIRCUIT

BACKGROUND OF THE INVENTION

1. Field of the Invention

The present invention relates to a mode processing circuit for a multiple operation mode electronic apparatus such as a video tape recorder, a tape deck, a video disc player, a compact disc player and so on.

2. Description of the Prior Art

Various operation modes, such as a playback mode, a rewind mode and the like are available in a known video tape recorder (hereinafter simply referred to as a VTR). To change these operation modes, it is necessary to switch the VTR or to move its brake and pinch roller into and out of engagement.

If a plunger is used to switch the mechanism, the change of the operation mode can be made substantially in a moment. The employment of the plunger, however, causes a large current to flow upon its actuation. Also, in the normal operation mode, a current must flow continuously, requiring a large power supply circuit which consumes a large amount of power.

It is therefore proposed to employ a motor instead of the plunger. When a motor is used together with a gear mechanism, atthough it is small in size, the necessary driving power to switch the mechanism is generated. Further, the employment of the motor can reduce the power consumption and allow the power supply circuit to be small in size. However, when a motor is used to switch the mechanism, the transition (switching) of its mode takes a lot of time. For example, it takes about 2 seconds for the VTR to change from the stop mode (STOP) to the playback mode (PB); it takes about 1.5 seconds for the VTR to change from the playback mode (PB) to the stop mode (STOP); and it takes about 1.8 seconds for the VTR to change from the stop mode (STOP) to the recording mode (REC).

Accordingly, when a user intends to press a second operation key after a first operation key has been depressed, the user must not press the second operation key until the VTR finishes changing to the mode commanded by the first key.

This is very inconvenient for the user, so it is proposed to stack input commands issued by pressing the operation keys.

Figure 1:
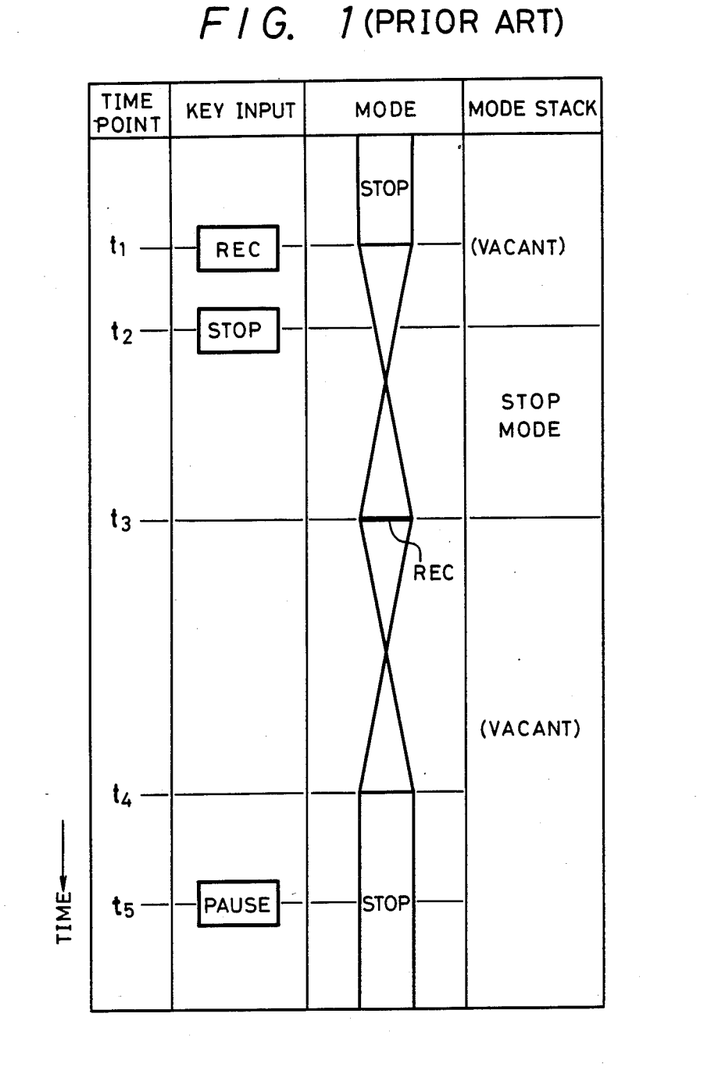
FIG. 1 is a mode transition diagram used to explain a known mode stack system for a video tape recorder.

Let it now be assumed that as, for example, illustrated in FIG. 1, the VTR is placed in the stop mode before time point $t_1$ and that a recording key is pressed at time point $t_1$. Then, the mode of the VTR (mechanism) begins to change from the stop mode to the recording mode at time point $t_1$.

If a stop key, for example, is pressed at time point $t_2$ during this transition period, this stop key is valid for the recording mode which is the mode after the mode is changed, so that the command instructing not the recording mode but the stop mode after the mode transition, is stacked in the mode stack.

When the mode transition of the VTR is ended at time point $t_3$, the VTR is placed in the recording mode (REC). At that time, the stop mode command stacked in the mode stack at time point $t_2$ is read out and the processing of this command is executed.

Accordingly, the VTR begins the transfer to the stop mode at time point $t_3$ and is placed in the stop mode at time point $t_4$. Even though a pause key is pressed at time point $t_5$ in the stop mode, the pause mode (PAUSE) is useless for the stop mode. Hence, the command issued by pressing the pause key is not executed.

As described above, according to this mode stack system, it becomes posiible to remove the cumbersome requirement that the user must not press the next operation key until the mode transition of the VTR is ended (even if the next key is pressed, this will be neglected). However, the above mentioned mode stack system has the following defect.

Figure 2:
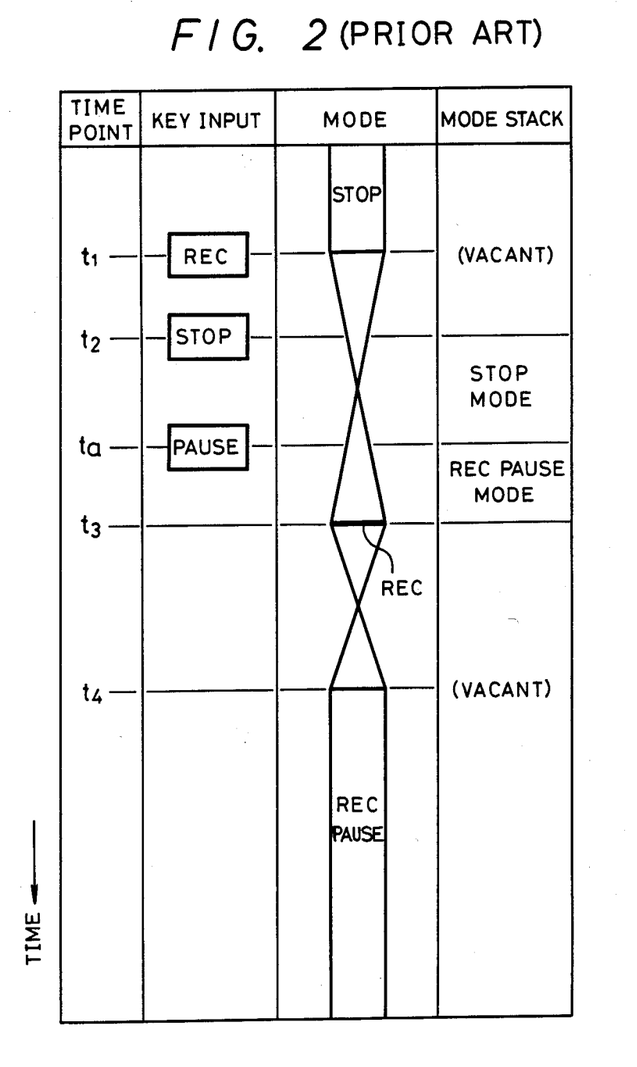
FIG. 2 is another mode transition diagram used to explain the same known mode stack system for a video tape recorder.

If the stop key is pressed at time point $t_2$ and the pause key is then pressed at time point $t_a$ as, for example, shown in FIG. 2, since this pause key is valid for the recording mode, which is the mode after the mode transition (if the pause key is depressed in the recording mode, the VTR is placed in the recording pause mode (REC PAUSE)), and the mode stacked in the mode stack is changed again from the stop mode to the recording pause mode.

Accordingly, the mode of the VTR is moved to the recording pause mode at time point $t_3$ and the VTR is placed in the recording pause mode at time point $t_4$.

Although the stop key and the pause key are pressed in the same sequential order as that of FIG. 1, the VTR is placed in an operation mode different from that in FIG. 1 in this case because of the timing of the depression of the pause key vis-a-vis the actual mode shifting of the VTR.

In other words, if a plurality of valid operation keys are depressed during the mode transition period, the mode stacked in the mode stack is renewed to the mode suggested by the operation key that was last pressed by the user and the modes commanded by the previously-pressed operation keys are all neglected. Accordingly, the operation mode of the VTR becomes different depending on the timing at which the user presses the operation keys (depending on whether the VTR mode was in the process of being changed or was already changed when the keys were pressed).

To overcome the above mentioned shortcomings, an improved mode stack system is proposed, in which the mode stack is arranged to have a plurality of stages to sequentially stack the input modes and to execute the modes sequentially.

This mode stack system having a plurality of stages, however, must remove useless or invalid modes stacked in the mode stack by optimizing the mode stacked. This makes a program of a mode control microcomputer complicated and takes a lot of time for such removal. This defect becomes serious particularly when 8-bit mode data is processed by a CPU (central processing unit) which is capable of providing only a 4-bit comparing command. Further, an area for the mode stack must be provided in a RAM.

OBJECTS AND SUMMARY OF THE INVENTION

Accordingly, it is a general object of this invention to provide an improved mode processing circuit for a multi-operation mode electronic apparatus, such as a VTR.

A more specific object of this invention is to provide an improved mode processing circuit for a multi-operation mode electronic apparatus, by which an operation mode can be changed in the shortest period of time to a desired operation mode when an operation key is pressed.

Another object of this invention is to provide a mode processing circuit for a multi-operation mode electronic apparatus in which the apparent time required by the mode transition can be removed.

A further object of this invention is to provide a mode processing circuit for a multi-operation mode electronic apparatus in which the VTR can be placed in the same final mode by pressing the corresponding operation key at any time.

Yet a further object of this invention is to provide a mode processing circuit for a multi-operation mode electronic apparatus in which the optimizing operation becomes unnecessary, so that the program of the mode controller is simplified, taking less time.

Still a further object of this invention is to provide a mode processing circuit for a multi-operation mode electronic apparatus which does not require a stack area.

Still a further object of this invention is to provide a mode processing circuit for use with a multi-operation mode electronic apparatus, such as a video tape recorder, a tape deck, a video disc player, a compact disc player and so on.

According to one aspect of the present invention, there is provided a mode processing circuit for a multi-operation mode electronic apparatus comprising:

a mode stack for receiving and storing operation mode commands for said multi-operation mode electronic apparatus;

means for sequentially storing said operation mode commands received by said mode stack and for optimizing the same; and means for deriving said optimized operation mode commands from said mode stack in the sequential order and then executing the same after the transition of said operation mode is ended.

According to another aspect of the present invention, there is provided a mode processing circuit for a multi-operation mode electronic apparatus comprising:

a transition vector look-up table memory means for indicating an operation mode to which the operation mode of said multi-operation mode electronic apparatus should be shifted;

means for determining a final mode of said multi-operation mode electronic apparatus in accordance with an input command;

means for determining a new operation mode to which the operation mode of said multi-operation mode electronic apparatus is to be shifted next from said final mode and a mode to which the operation mode of said multi-operation mode electronic apparatus was shifted with reference to said transition vector look-up table memory means; and means for changing the operation mode of said multi-operation mode electronic apparatus to said operation mode thus determined and then placing said multi-operation mode electronic apparatus in said final mode.

These and other objects, features and advantages of the present invention will become apparent from the following detailed description of the preferred embodiments that are to be read in conjunction with the accompanying drawings, throughout which like reference numerals identify like elements and parts.

DESCRIPTION OF THE PREFERRED EMBODIMENTS

Now, the present invention will hereinafter be described in detail with reference to the drawings.

Figure 3:
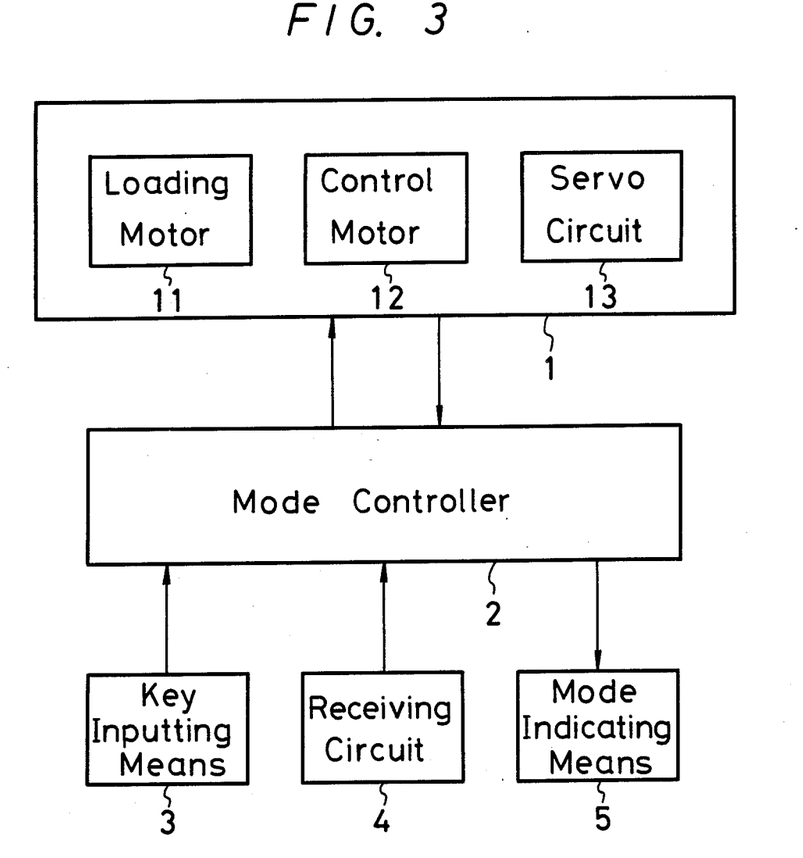
FIG. 3 is a block diagram of an embodiment of a mode processing circuit according to the present invention, illustrating hardware relating to the mode transition operation of a video tape recorder.

FIG. 3 illustrates hardware relating to the mode transition operation of the VTR according to the present invention.

Referring to FIG. 3, there is shown a mechanism (VTR) control section 1 which includes a loading motor 11 for loading or unloading a tape on or from the VTR, a control motor 12 for controlling the mode of the VTR and a servo circuit 13 for controlling a drum and a capstan of the VTR.

A mode controller 2 is formed of a microcomputer whose output is supplied to the control section 1 to place the VTR in each operation mode. At the same time, a signal indicative of the state (mode) of the VTR is supplied from the control section 1 to the mode controller 2.

Key input means 3 is provided with a plurality of operation keys (not shown). A receiving circuit 4 is adapted to receive a signal inputted by the operation key of a remote controller (not shown) when the VTR is operated by the remote controller. The key input signals from the key input means 3 and the receiving circuit 4 are both supplied to the mode controller 2. Mode indicating means 5 visually indicates to the user, e.g. by an LCD display, the mode in which the VTR is placed, on the basis of the output signal from the mode controller 2.

The mode stack is provided within a RAM (random access memory) of the microcomputer which forms the mode controller 2.

When the operation key of the key inputting means 3 or the operation key of the remote controller (not shown) is pressed, its command is processed by the mode controller 2 and the processed result or data is supplied to the control section 1, so that the control section 1 is operated so as to place the VTR in a predetermined operation mode. At the same time, the corresponding mode of the VTR is visually indicated by the mode indicating means 5.

Figure 4:
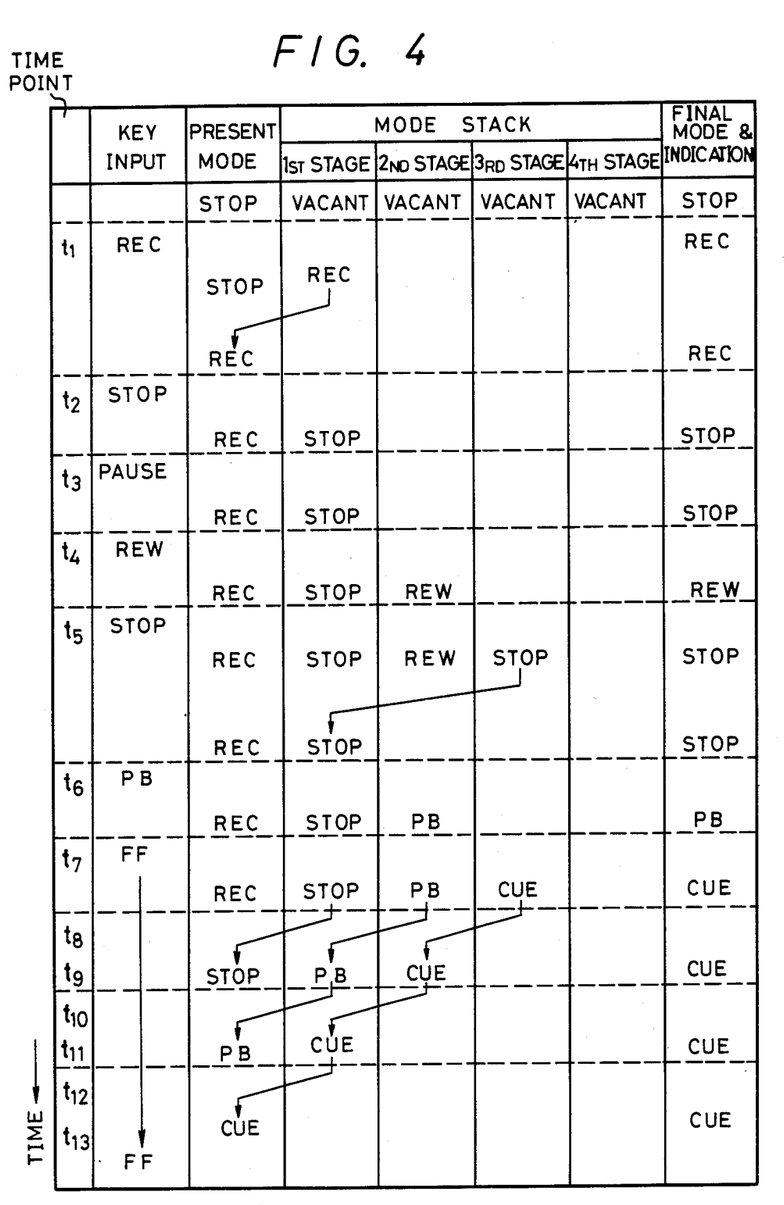
FIG. 4 is a mode transition diagram used to explain the present invention.

FIG. 4 illustrates, by way of example, how the VTR mode and data stacked in the mode stack are changed with the command inputted when the operation key is pressed at a certain time point.

In the description below, "present mode" and "final mode" are respectively defined as follows: the "present mode" indicates the mode of the VTR at that certain time point and also indicates, during the mode transition period of the VTR, the net mode to which the VTR is to be placed; and the "final mode" indicates the mode stored last in the mode controller 2 at that certain time point. The final mode becomes the same as the present mode when no mode data is stacked in the mode stack at all. Validity of the operation key pressed is judged depending upon whether the operation key pressed is valid for the final mode or not. The mode indicating means 5 visually indicates the final mode.

In the illustrated example of FIG. 4, since the VTR is placed in the stop mode before time point $t_1$, the present mode is the stop mode. At the same time, no mode is stacked in the mode stack and the final mode and the visual indication thereof are the stop mode.

When the recording key is pressed at time point $t_1$, this recording mode is valid for the final mode (stop mode), so that "REC" (recording mode) is stacked in the first stage of the mode stack. However, since the VTR has not yet started changing its operation mode, the VTR immediately starts changing its mode from the stop mode to the recording mode, and "REC" is indicated by the mode indicating means 5. Further, the "REC" mode command stacked in the mode stack is removed.

If the stop key is pressed at time point $t_2$ while the VTR is changing its mode, the stop mode is valid for the final mode (recording mode), so that "STOP" (stop mode) is stacked in the first stage of the mode stack and the final mode and the visual indication thereof are made the stop mode. However, the VTR itself is changing its operation mode into the recording mode (present mode) which was dsignated by the key input at time point $t_1$.

When the pause key is pressed at time point $t_3$, while the VTR is in the mode transition period, the pause mode is invalid for the final mode (stop mode), so that this key input is neglected, leaving the mode stack, the final mode and the visual indication unchanged.

When the rewind key is pressed at time point $t_4$, while the VTR is in the mode transition period, the rewind mode is valid for the final mode (stop mode), so that "REW" (rewind mode) is stacked in the second stage of the mode stack and the final mode and the visual indication thereof are made the rewind mode. However, the VTR itself is still in the process of changing its operation mode into the recording mode (present mode) which was designated by the key input at time point $t_1$.

When the stop key is pressed at time point $t_5$ while the VTR is in the mode transition period, the stop mode is valid for the final mode (rewind mode), so that "STOP" (stop mode) is stacked in the third stage of the mode stack. At that time, since the same "STOP" (stop mode) is also stacked in the first stage of the mode stack, "STOP" and "REW" stacked respectively in the first and second stages of the mode stack are removed and "STOP" stacked in the third stage of the mode stack is transferred to the first stage of the mode stack. This processing is an example of what may be called "optimization". In that case, the final mode and the visual indication thereof are made stop mode.

When the playback key is pressed at time point $t_6$, while the VTR is in the mode transition period, the playback mode is valid for the final mode (stop mode), so that "PB" (playback mode) is stacked in the second stage of the mode stack and the final mode and the visual indication thereof are made the playback mode.

When the fast forward key is pressed continuously from the time point $t_7$ while the VTR is in the mode transition period, the fast forward mode is valid for the final mode (playback mode). At the same time, upon the playback mode, the fast forward key is pressed in the cue mode, so that "CUE" (cue mode) is stacked in the third stage of the mode stack and the final mode and the visual indication thereof are made the cue mode.

At time point $t_8$, when the VTR finishes changing its operation mode into the recording mode designated by the key input at time point $t_1$, the mode stack is checked. In this case, since "STOP" is stacked in the first stage of the mode stack, this "STOP" is set to the present mode and the VTR therefore starts changing its operation mode to the stop mode at time point $t_9$ ($\cong t_8$). When it is confirmed that the operation mode of the VTR is to be changed to the stop mode, "PB" stacked in the second stage of the mode stack is transferred to the first stage thereof and "CUE" stacked in the third stage of the mode stack is transferred to the second stage thereof, making the third stage of the mode stack empty.

When the VTR has finished changing its operation mode to the stop mode at time point $t_{10}$, the mode stack is checked. In this case, since "PB" is stacked in the first stage of the mode stack, this "PB" is set to the present mode, so that the VTR starts changing its operation mode to the playback mode at time point $t_{11}$ ($\cong t_{10}$). After it is confirmed that the operation mode of the VTR was changed to the playback mode, "CUE" stacked in the second stage of the mode stack is transferred to the first stage thereof, thus making the second stage of the mode stack empty.

When the VTR has finished changing its mode to the playback mode at time point $t_{12}$, the mode stack is checked. Since "CUE" is stacked in the first stage of the mode stack, this "CUE" is set to the present mode, so that the VTR starts changing its operation mode into to the cue mode at time point $t_{13}$ ($\cong t_{12}$). After it is confirmed that the operation mode of the VTR was changed to the cue mode, the mode stack is made empty. In this way, the VTR is placed in the cue mode after time point $t_{13}$.

While the operation mode of the VTR and mode data stacked in the mode stack are changed as described above, this will be also explained with reference to a general algorithm which is represented in the form of a flow chart in FIG. 5.

This algorithm is exemplified in the flow chart (FIG. 5) of the program that the microcomputer forming the mode controller 2 (FIG. 3) executes.

Figure 5:
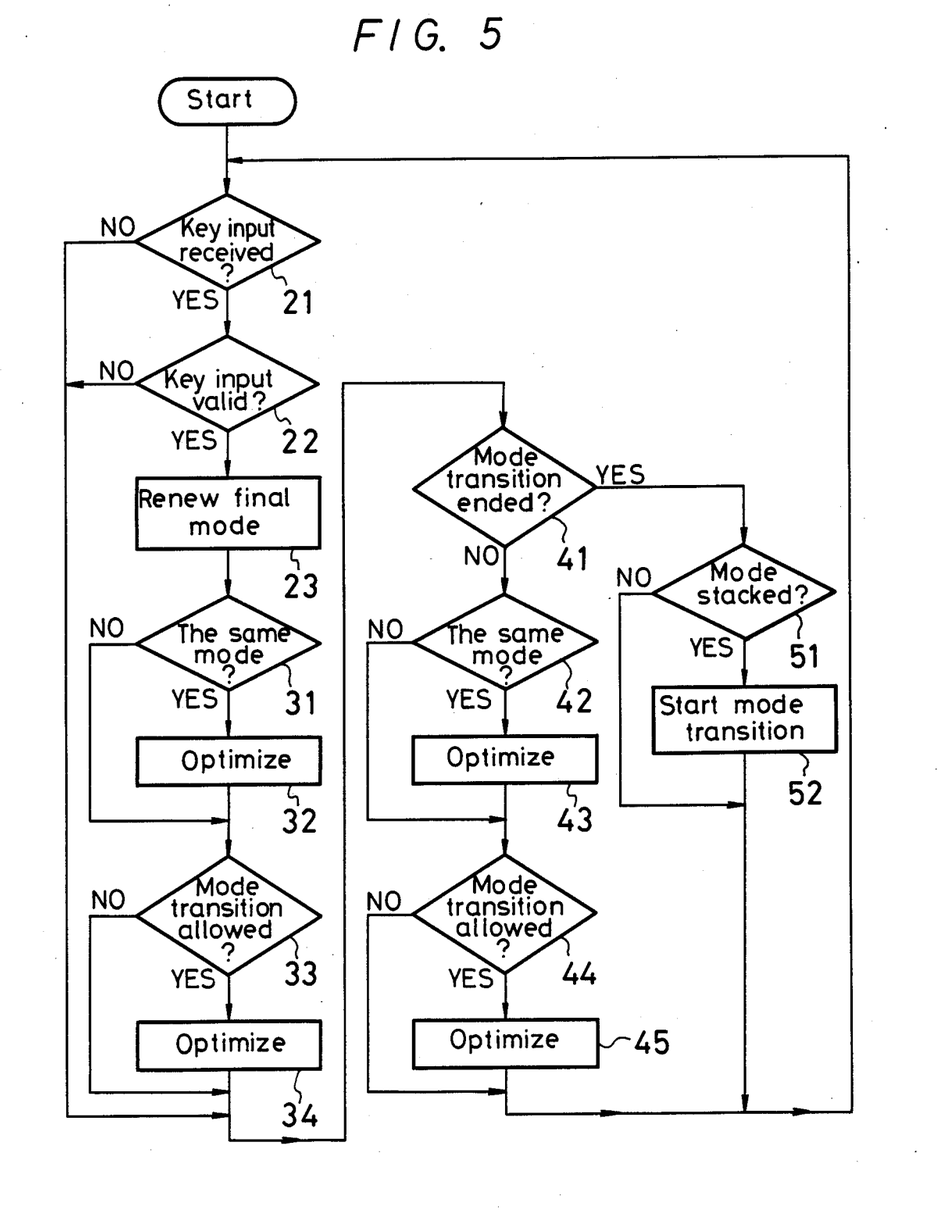
FIG. 5 is a flow chart used to explain the mode transition operation in association with the mode transition diagram of FIG. 4.

The presence or absence of the command (key input) inputted by the operation key is checked, as represented at decisional step 21 in FIG. 5. If the command exists, the processing of the microcomputer (mode controller 2) goes from step 21 to decisional step 22. Then, it is checked, as represented at decisional step 22, whether or not the key input of which the presence was confirmed at step 21 is valid for the final mode. The validity of the key input relative to the final mode is checked on the basis of a mode transition look-up table which forms, for example, FIG. 6. Such a look-up table can be store within a ROM (read only memory) which forms the mode controller 2 (FIG. 3). This mode transition look-up table of FIG. 6 reads as follows.

Figure 6:
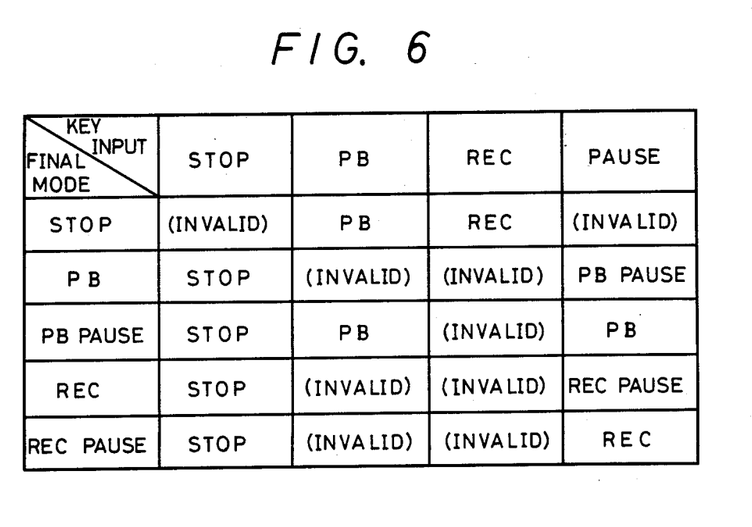
FIG. 6 is a table used to explain an algorithm of the mode transition and the change of data stacked in a mode stack.

If the recording key ("REC") is pressed when the final mode is, for example, the playback ("PB") mode, it is judged that this recording key is invalid for the final mode, however, if the pause key is pressed instead, it is judged that this pause key is valid for the final mode and the final mode is renewed to "PB PAUSE" (playback pause mode).

Figure 7:
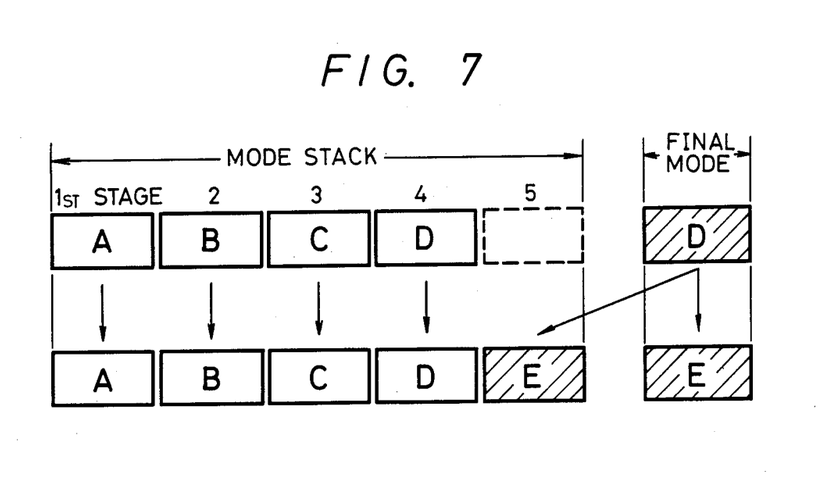
FIG. 7 is a diagram used to explain the mode stack of the invention.

If the key input is judged to be valid as represented at decisional step 22, the processing of the microcomputer goes from step 22 to step 23. As represented at step 23, the final mode and the visual indication thereof are renewed at time point $t_4$ shown, for example, in FIG. 4 and in FIG. 7 (reference letters A to E throughout FIGS. 7 to 11 respectively designate operation modes) in accordance with the mode transition look-up table of FIG. 6. Then, the operation mode renewed is stacked in the mode stack.

The processing of the microcomputer goes from step 23 to the next decisional step 31. It is checked, as represented at decisional step 31, whether or not a mode which is the same as the renewed final mode is stacked in the mode stack. If not, the processing of the microcomputer goes from step 31 to decisional step 33.

Figure 8:
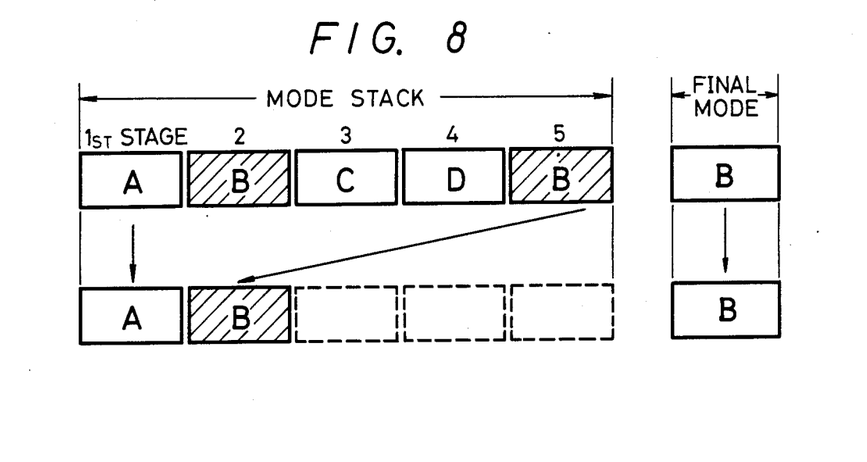
FIGS. 8, 9, 10 and 11 are respectively diagrams used to explain the mode transition operation and the mode stack of the invention.

If on the other hand the same mode is stacked in the mode stack, as for example shown at time point $t_5$ in FIG. 4 and as illustrated in FIG. 8, the processing of the microcomputer goes from step 31 to the next step 32. As represented at step 32, the modes, beginning from the mode (B mode in the second stage) which is the same as the final mode renewed in the mode stack up to the mode (D mode) just one stage before the final stage of the mode stack, are removed as unnecessary modes and the final mode renewed is shifted to the prior stage of the mode stack. This processing forms a part of "optimization".

Figure 9:
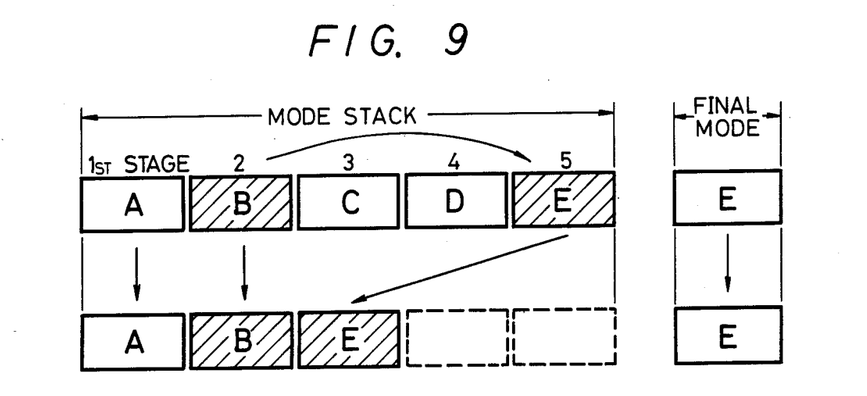

Then, the processing of the microcomputer goes from step 32 (or step 31) to decisional step 33 where it is checked whether or not a mode which can be changed directly to the final mode is stacked in the mode stack, thereby omitting unnecessary intermediate modes. If not, the processing of the microcomputer goes from step 33 to decisional step 41. If on the other hand such a mode is stacked in the mode stack, the processing of the microcomputer goes from step 33 to step 34. At step 34, as shown in FIG. 9, the modes between the mode (B mode), which can be changed to the final mode, and the final mode (E mode) are removed and the final mode (E mode) is shifted to the stage of the mode stack subsequent to the mode which can be changed to the final mode (B mode). This processing also forms a part of "optimization".

The processing of the microcomputer goes from step 34 (or step 33) to the next decisional step 41. Also, if the absence of a key input is determined, as represented at decisional step 21, or if the key input is invalid for the final mode, as represented at decisional step 22, the processing of the microcomputer goes directly from step 21 or 22 to the decisional step 41.

Figure 10:
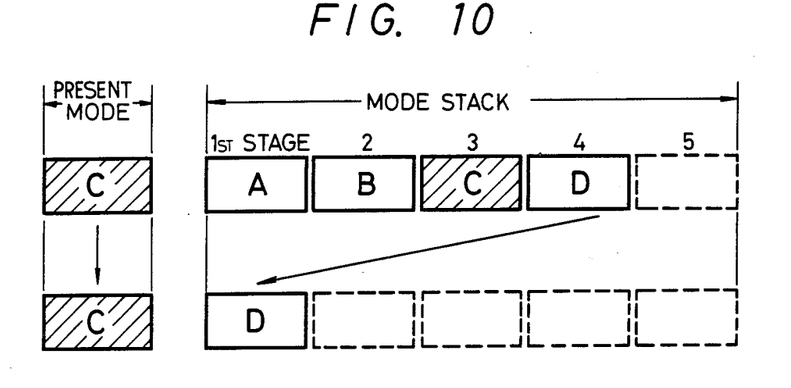

At decisional step 41 the microcomputer checks whether the VTR is now changing its operation mode or has finished its mode changing. If the VTR is changing its operation mode, the processing of the microcomputer goes from step 41 to the next decisional step 42 where the microcomputer checks whether a mode which is the same as the present mode exists in the mode stack or not. If not, the processing of the microcomputer goes from step 42 to decisional step 44. If the same mode exists in the mode stack as represented at decisional step 42, as shown, for example, in FIG. 10, the processing of the microcomputer goes from step 42 to step 43. As represented at step 43, the modes from the mode (A mode) of the first stage to the mode (C mode) which is the same as the mode which is under transition, are removed and the next mode (D mode) is shifted forward (to the first stage of the mode stack). This processing also forms a part of "optimization".

Figure 11:
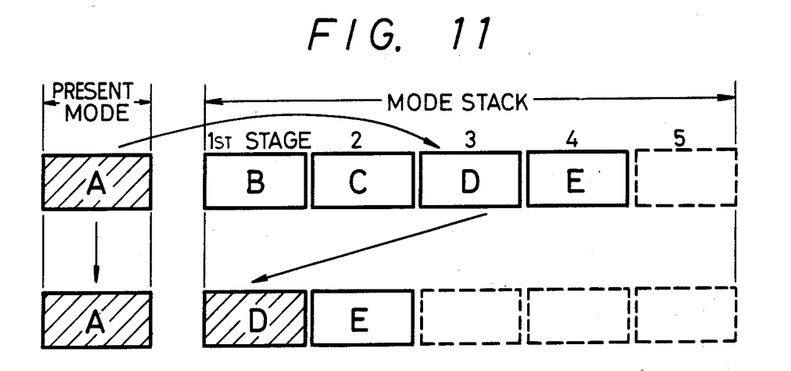

Subsequently, the processing of the microcomputer goes from step 43 (or step 42) to the next decisional step 44 where it is checked whether or not there is a mode in the mode stack to which the present mode of the VTR in its transition period can be directly shifted, as for example, shown in FIG. 11 (mode A can be shifted to mode D). If not, the processing of the microcomputer returns from step 44 to the decisional step 21. If such a mode exists in the mode stack the processing goes from step 44 to step 45.

At step 45 the modes from the mode in the first stage to the mode (C mode) which is located just before the transferrable mode are removed and the succeeding mode (D mode) is shifted forward in the mode stack, so that "optimization" is carried out. Then, the processing of the microcomputer goes back to step 21.

If it is determined, as represented at decisional step 41, that the VTR has already finished changing its operation mode, the processing of the microcomputer goes from step 41 to decisional step 51. It is then checked, as represented at decisional step 51, whether or not any mode command remains stacked in the mode stack. If no mode is stacked in the mode stack, the processing of the microcomputer goes back from step 51 to step 21. If, on the other hand, one or more modes remain stacked in the mode stack, the processing of the microcomputer goes from step 51 to step 52 where the present mode of the VTR begins to change into the mode of the first stage in the mode stack. If it is confirmed that the change of the operation mode of the VTR is started, the mode of the first stage in the mode stack is removed and the next mode is shifted forward. Subsequently, the processing of the microcomputer goes back from step 52 to step 21.

Therefore, according to the above described processing routine, the operation mode of the VTR is changed as, for example, shown in FIG. 4.

Alternatively, the presence or absence of the key input can be checked by executing the condition determining command instead of using the mode transition look-up table, as represented at decisional step 21.

Furthermore, the present invention is not limited to a VTR (mechanism) but can similarly be applied to various other kinds of multi-operation mode electronic apparatus, such as, a tape deck, a video disc player or a compact disc (CD) player and the like which require a lot of time to change their operation modes.

Figure 12:
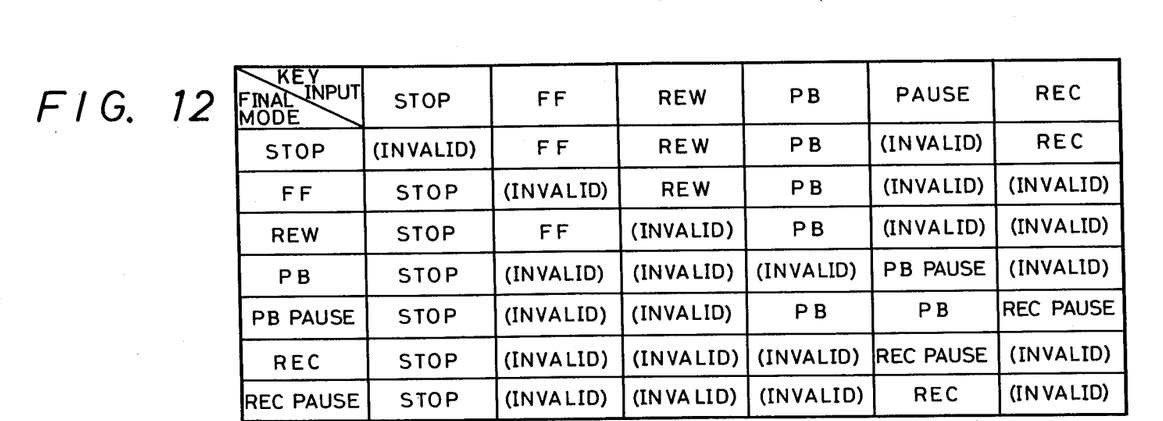
FIG. 12 is a mode transition table used to explain another embodiment of the mode processing circuit for a multi-operation mode electronic apparatus according to the present invention.
Figure 13:
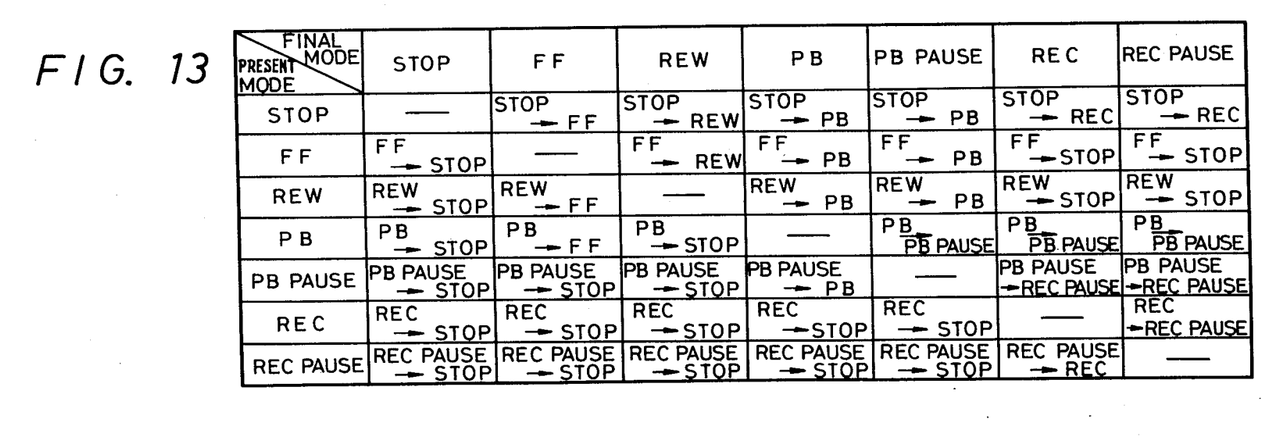
FIG. 13 is a transition vector table used to explain the operation of the present invention.

Another embodiment of the mode processing circuit according to the present invention will now be described. This embodiment is similar to that shown in FIG. 3 but in this embodiment, a mode transition look-up table and a mode transition vector look-up table shown, for example, in FIGS. 12 and 13 are provided within a ROM (read only memory) which forms the mode controller 2 (FIG. 3).

When the operation key of the inputting means 3 or the operation key of the remote controller (not shown) is pressed, the input data or command is similarly supplied to the mode controller 2, in which it is processed. The processed result or data therefrom is then supplied to the control section 1, whereby the control section 1 is so operated as to place, for example, the VTR in the predetermined operation mode and the operation mode in which the VTR is just placed is visually indicated by the mode indicating means 5 similar to the first embodiment.

Figure 14:
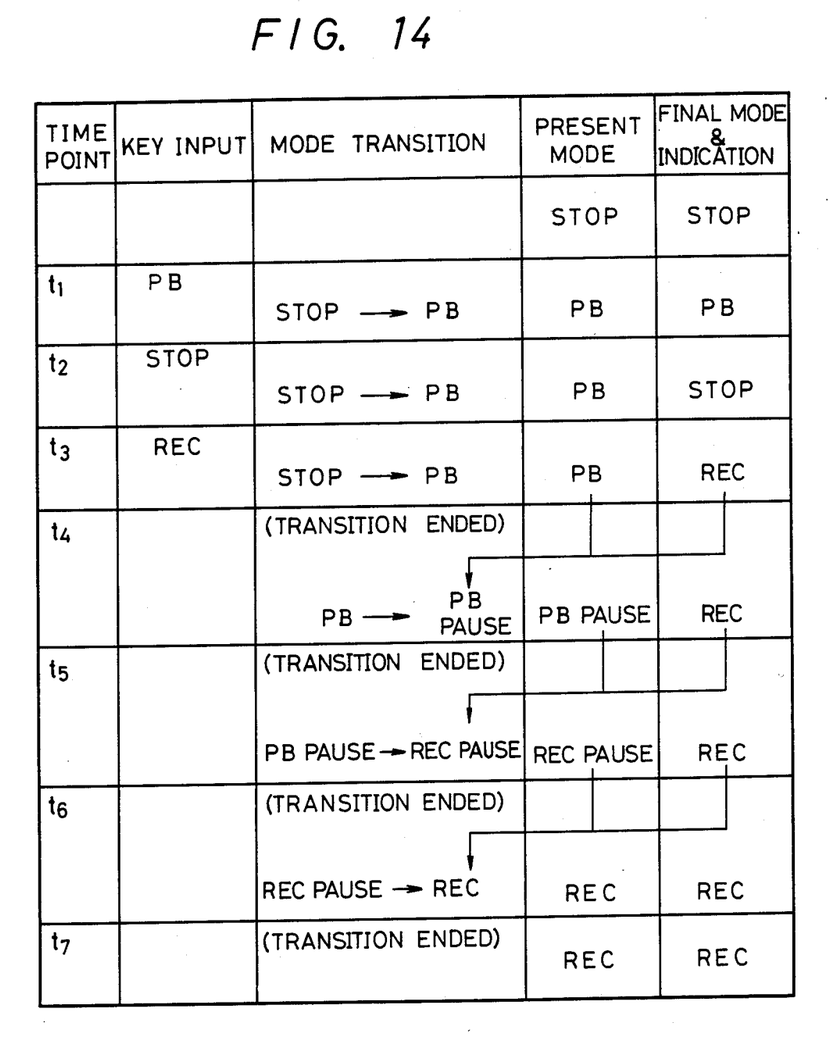
FIG. 14 is a mode transition diagram used to explain the operation of the present invention.

FIG. 14 illustrates an example in which the operation mode of the VTR is changed with the command inputted by the operation key using this second embodiment.

In the description below, "present mode" and "final mode" are respectively defined as follows: the "present mode" indicates the mode in which the VTR is now placed at a certain time point and also indicates the next operation mode of the VTR during the mode transition period; and the "final mode" indicates the mode stored last in the mode controller 2 at that time point. The validity of the operation key pressed is determined depending upon whether the operation key pressed is valid for the final mode or not. The mode indicating means 5 visually indicates the final mode.

The areas in which the present mode and the final mode are stored are formed within the RAM of the microcomputer forming the mode controller 2.

In this embodiment, since the VTR is paaced in the stop mode before time point $t_1$, the present mode at time point $t_1$ is the stop mode. Also, the final mode and the visual indication thereof are the stop mode.

When the reproducing key is pressed at time point $t_1$ in FIG. 14, the mode transition table in FIG. 12 is looked up by the microcomputer. This mode transition look-up table in FIG. 12 indicates whether or not, when the operation key is depressed, the key input is valid for the final mode at that time point or if the key input is valid for the final mode, to which mode the mode is to be transferred. Since the final mode is the stop mode at time point $t_1$ and the key input is the playback mode, it will be clear from the mode transition look-up table of FIG. 12 that the operation mode of the VTR should be "PB" (playback mode).

Accordingly, the final mode and the visual indication thereof are made the playback mode from time point $t_1$. Further, the VTR (mechanism) starts changing its operation mode from the stop mode into the playback mode and the present mode is made the playback mode.

When the stop key is pressed at time point $t_2$ while the VTR is in the mode transition period as shown in FIG. 14, the mode transition look-up table of FIG. 12 is looked up. Since this mode transition look-up table of FIG. 12 indicates that the mode should be shifted to the stop mode, the final mode and the visual indication thereof are made the stop mode. However, during this period, the VTR itself continues changing its operation mode to the playback mode (present mode) which was designated by the key input at time point $t_1$.

Further, when the recording key is pressed at time point $t_3$ during this mode transition period of the VTR, the same mode transition table (FIG. 12) is looked up. This mode transition look-up table of FIG. 12 indicates that the mode should be shifted to the recording mode. Thus, the final mode and the visual indication thereof are made the recording mode. However, during this period, the VTR itself continues changing its operation mode into the playback mode which was designated by the key input at time point $t_1$.

When at time point $t_4$ the operation mode of the VTR has finally changed into the playback mode, the mode transition vector table forming FIG. 13 is looked up. This mode transition vector look-up table of FIG. 13 indicates whether or not at that time the VTR should further change its operation mode and the mode into which the VTR should change its operation mode. At that time (at time point $t_4$ in FIG. 14), since the present mode is the playback mode and the final mode is the recording mode, the mode transition vector look-up table of FIG. 13 indicates that the mode of the VTR should be "PB PAUSE" (playback pause mode). Accordingly, the VTR starts changing its operation mode to the playback pause mode from time point $t_4$ and the present mode is changed into the playback pause mode, too.

When the mode transition to the playback pause mode is ended at time point $t_5$, the same mode transition vector table of FIG. 13 is looked up. At time point $t_5$ in FIG. 14, since the present mode is "PB pause" (playback pause mode) and the final mode is "REC" (recording mode), it will be clear from the mode transition vector look-up table of FIG. 13 that the mode should be "REC PAUSE" (recording pause mode) next. Accordingly, the VTR starts changing its operation mode into the recording pause mode at time point $t_5$ and the present mode is made the recording pause mode, too.

When the mode transition of the VTR to the recording pause mode is ended at time point $t_6$ in FIG. 14, the mode transition vector table of FIG. 13 is looked up again. At time point $t_6$ in FIG. 14, since the present mode is the recording pause mode and the final mode is the recording mode, the mode transition vector look-up table of FIG. 13 indicates that the next mode should be the recording mode. Accordingly, the VTR starts changing its operation mode into the recording mode at time point $t_6$, and the present mode is made the recording mode, too.

When the mode transition to the recording mode is ended at time point $t_7$, the mode transition vector table of FIG. 13 is looked up. At time point $t_7$ in FIG. 14, since the present mode and the final mode are both the recording mode and equal to each other, the operation mode of the VTR is not change any more. Accordingly, the VTR remains placed in the recording mode after time point $t_7$.

Figure 15:
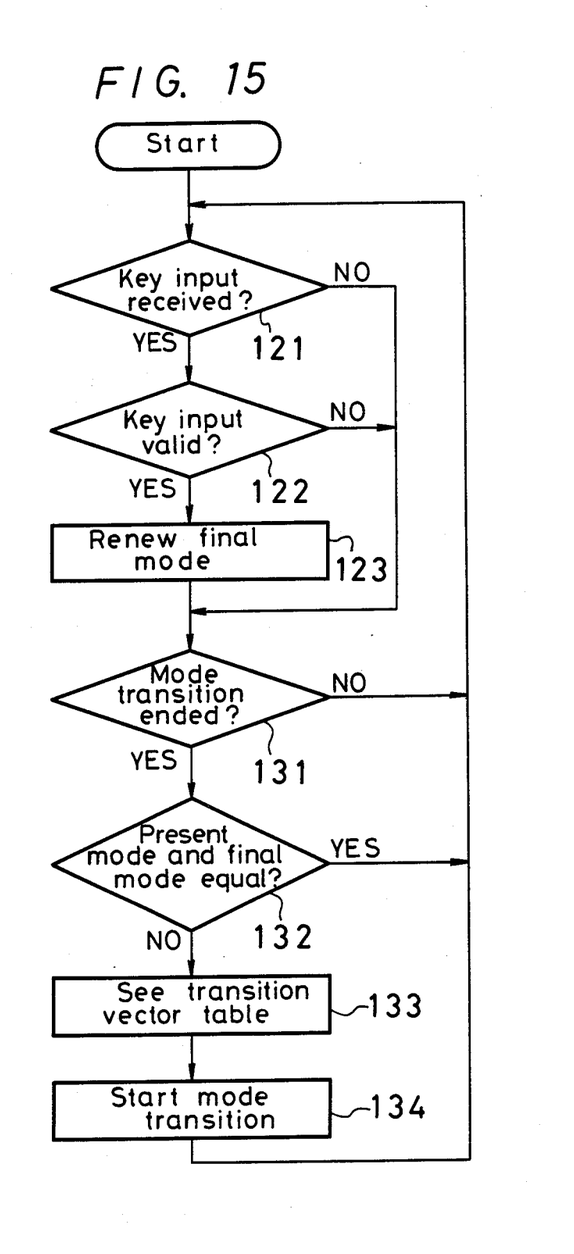
FIG. 15 is a flow chart used to explain the operation of the present invention.

While the operation mode of the VTR is changed as described above, this mode changing operation of the VTR will be similarly explained by a general algorithm which is represented in a flow chart forming FIG. 15.

In other words, this algorithm forms the flow chart (FIG. 15) of a program that the microcomputer forming the mode controller 2 (FIG. 3) executes.

Firstly, the presence or absence of a command inputted by pressing an operation key is checked as represented at decisional step 121. If the presence of the command is confirmed at step 121, the processing of the microcomputer (mode controller 2) goes from step 121 to the next decisional step 122. It is checked as represented at decisional step 122 by the mode transition look-up table of FIG. 12 whether or not the key input (command) whose existence was checked at step 121 is valid for the final mode.

If it is judged as represented at decisional step 122 that the key input is valid for the final mode, the processing of the microcomputer goes from step 122 to step 123, in which the final mode and the mode visual indication thereof are renewed in accordance with the mode transition look-up table of FIG. 12, as represented at time point $t_1$ in FIG. 14. Then, the processing of the microcomputer goes from step 123 to the next decisional step 131.

Also, if the absence of the key input is confirmed as represented at decisional step 121 or it is judged as represented at decisional step 122 that the key input is invalid for the final mode, the processing of the microcomputer goes directly from steps 121 and 122 to the next decisional step 131.

It is checked, as represented at decisional step 131, whether the mode of the VTR is still shifting or it has already finished. If the mode of the VTR is shifting, the processing of the microcomputer goes back from step 131 to step 121.

Accordingly, the steps 121 to 123 and the step 131 are repeatedly executed during the period from the time point $t_1$ to the time point $t_4$.

If on the other hand it is judged, as represented at decisional step 131, that the mode transition of the VTR is already ended, the processing of the microcomputer goes from step 131 to the next decisional step 132. There, it is checked whether or not the present mode is equal to the final mode. If they are not equal to each other, the processing of the microcomputer goes from step 132 to step 133. As represented at step 133, the operation mode to which the mode of the VTR should be newly shifted is determined with reference to the mode transition vector look-up table of FIG. 13, whereby the present mode is renewed to the new operation mode determined.

Then, the processing of the microcomputer goes from step 133 to step 134. The VTR starts changing its operation mode to the present mode, which was renewed as represented at step 133, as represented at step 134, and the processing of the microcomputer goes back from step 134 to step 121.

Consequently, the steps 131 to 134 are executed at time points $t_4$, $t_5$ and $t_6$ in the mode transition diagram forming FIG. 14, respectively.

If it is judged, as represented at decisional step 132, that the present mode and the final mode are equal to each other, the processing of the microcomputer goes back from step 132 to step 121.

Accordingly, this processing of the microcomputer is executed at time point $t_7$.

According to the processing routine in FIG. 15 as described above, the operation mode of the VTR is changed as, for example, shown in the mode transition diagram of FIG. 14.

It will be appreciated that the presence or absence of the command inputted by the operation key can be checked by using a condition judging command instead of using the above mentioned mode transition look-up table, as represented at decisional step 122 in FIG. 15.

The present invention is not limited to a VTR as mentioned above but can be applied to various kinds of multi-operation mode electronic apparatus such as a tape deck, a video disc player, a CD (compact disc) player and the like which take a lot of time to change their operation modes.

According to the present invention, since the transition mode to which the mode of the multi-operation mode electronic apparatus should be transferred is stacked in the mode stack and is optimized, the operation mode of the multi-operation mode electronic apparatus can be changed to the desired operation mode in the shortest period of time at the time point at which the operation key is pressed.

If the key input is valid, the reception of the key input and the visual indication of the operation mode can be immediately executed and the transition of the operation mode of the multi-operation mode electronic apparatus can be carried out in the shortest period of time, so that the user never feels that the multi-operation mode electronic apparatus is taking a great deal of time to change its operation mode and thus, the apparent time required by such a mode transition can be removed. Further, the operation mode can be changed to the same final operation mode by pressing the operation key at any timing.

Furthermore, according to the present invention, as set forth above, even if any number of operation keys are pressed, since the operation mode to which the mode of the multi-operation mode electronic apparatus should be shifted can be made optimum in accordance with the mode transition vector look-up table, the operation mode can be changed to the desired mode in the minimum number of mode transitions at the time point at which the operation key is pressed.

In addition, since the optimization is not required, the processing program to be executed by the mode controller 2 can be simplified and the execution of the program does not take a lot of time. Also, the mode stack area becomes unnecessary.

The above description is given for the preferred embodiments of the invention but it will be apparent that many modifications and variations could be effected by one skilled in the art without departing from the spirit or scope of the novel concepts of the invention, so that the scope of the invention should be determined by the appended claims only.

We claim as our invention:

1. A method for changing the operation mode of an multi-operation mode electronic apparatus during a period in which the operation mode is transferring from a present operation mode to a final operation mode, comprising the steps of:
   (a) receiving an input command signal;
   (b) judging whether said input command signal is valid or not in view of the operation mode corresponding to previously received, valid command signals;
   (c) redetermining the final operation mode in accordance with said valid input command signal;
   (d) determining a sequence of mode changes from the present operation mode to the final operation mode; and
   (e) executing said sequence of mode changes until said present operation mode is equal to said final operation mode.

2. A method according to claim 1 wherein said step of receiving comprises storing in an electronic memory device a plurality of said input command signals and said step of determining comprises the step of optimizing said input command signals according to predetermined criteria.

3. A method according to claim 1 wherein said steps of determining and executing are performed by electronically accessing a transition vector look-up table stored in an electronic memory device.

4. A method for changing the operation mode of an multi-operation mode electronic apparatus as recited in claim 1 wherein the step of judging the validity of the input command signal comprises determining that the following input commands are invalid with respect to the following corresponding final modes:

| FINAL MODE | INPUT COMMAND |
|---|---|
| STOP | STOP |
| FAST FWD. | FAST FWD., PAUSE, REC. |
| REW. | REW., PAUSE, REC. |
| PLAYBACK | FAST FWD., REW., PB, REC. |
| PB PAUSE | FAST FWD., REW. |
| RECORD | FAST FWD., REW., PB, REC. |
| REC. PAUSE | FAST FWD., REW., PB, REC. |

5. A mode processing circuit for a multi-operation mode electronic apparatus comprising:
   means for generating input command signals;
   mode stack means having a plurality of stages for storing each said input command signal as an operation mode for said multi-operation mode electronic apparatus;
   means for storing said operation modes in said mode stack means in a sequential order and for optimizing the same according to predetermined criteria; and
   means for deriving said operation modes from said mode stack in the sequential order and then executing the same after the transition of said multi-operation mode electronic apparatus to each operation mode is ended.

6. A mode processing circuit for a multi-operation mode electronic apparatus comprising:
   transition vector look-up table means for indicating a operation mode to which the operation mode of said multi-operation mode electronic apparatus should be shifted;
   means for receiving an input command signal and determining a final mode of said multi-operation mode electronic apparatus in accordance therewith;
   means for determining a new operation mode to which the operation mode of said multi-operation mode electronic apparatus is to be shifted next from said final mode and a mode to which the operation mode of said multi-operation mode electronic apparatus was shifted with reference to said transition vector look-up table means; and
   means for changing the operation mode of said multi-operation mode electronic apparatus to said operation mode thus determined and then placing said multi-operation mode electronic apparatus in said final mode.

7. A mode processing circuit for a multi-operation mode electronic apparatus as recited in claim 6, wherein said transition vector look-up table means comprises an electronic memory which stores the following transition mode commands:

| Present mode | Final mode | Transition Command |
|---|---|---|
| STOP | PB PAUSE | STOP TO PLAYBACK |
| FAST FORWARD | PB PAUSE | FAST FWD. TO PB |
| FAST FORWARD | RECORD | FAST FWD. TO STOP |
| FAST FORWARD | REC. PAUSE | FAST FWD. TO STOP |
| REWIND | PB PAUSE | REWIND TO PB |
| REWIND | RECORD | REWIND TO STOP |
| REWIND | REC. PAUSE | REWIND TO STOP |
| PLAYBACK | RECORD | PB TO PB PAUSE |
| PLAYBACK | REC. PAUSE | PB TO PB PAUSE |
| PB PAUSE | FAST FWD. | PB PAUSE TO STOP |
| PB PAUSE | REWIND | PB PAUSE TO STOP |
| PB PAUSE | RECORD | PB PAUSE TO REC. PAUSE |
| PB PAUSE | REC. PAUSE | PB PAUSE TO REC. PAUSE |

8. A mode processing circuit for a multi-operation mode electronic apparatus as recited in claim 6 or 7, wherein said transition vector look-up table means comprises an electronic memory which stores the following transition mode commands:

| Present mode | Final mode | Transition Command |
|---|---|---|
| RECORD | REWIND | RECORD TO STOP |
| RECORD | FAST FWD. | RECORD TO STOP |
| RECORD | PLAYBACK | RECORD TO STOP |
| RECORD | PB PAUSE | RECORD TO STOP |
| REC. PAUSE | REWIND | REC. PAUSE TO STOP |
| REC. PAUSE | FAST FWD. | REC. PAUSE TO STOP |
| REC. PAUSE | PLAYBACK | REC. PAUSE TO STOP |
| REC. PAUSE | PB PAUSE | REC. PAUSE TO STOP |

* * * * *